United States Patent
Leuschner et al.

(10) Patent No.: US 10,121,248 B2
(45) Date of Patent: Nov. 6, 2018

(54) AUTOMATED SYSTEM AND METHOD FOR DETERMINING POSITIONAL ORDER THROUGH PHOTOMETRIC AND GEOSPATIAL DATA

(71) Applicant: Raytheon BBN Technologies, Corp., Cambridge, MA (US)

(72) Inventors: Zachary Eric Leuschner, Annapolis, MD (US); Joshua Nathaniel Edmison, Ellicott City, MD (US); Harrison Brownley, Annapolis, MD (US); John-Francis Mergen, Baltimore, MD (US)

(73) Assignee: Raytheon BBN Technologies, Corp., Cambridge, MA (US)

( * ) Notice: Subject to any disclaimer, the term of this patent is extended or adjusted under 35 U.S.C. 154(b) by 62 days.

(21) Appl. No.: 15/242,384

(22) Filed: Aug. 19, 2016

(65) Prior Publication Data
US 2018/0053303 A1    Feb. 22, 2018

(51) Int. Cl.
| | | |
|---|---|---|
| G06K 9/00 | (2006.01) |
| G06T 7/00 | (2017.01) |
| G01C 21/00 | (2006.01) |
| G01C 21/20 | (2006.01) |
| G01C 11/04 | (2006.01) |
| H04N 5/232 | (2006.01) |
| G06T 7/60 | (2017.01) |
| H04N 5/14 | (2006.01) |
| H04N 7/18 | (2006.01) |

(52) U.S. Cl.
CPC ............ *G06T 7/0042* (2013.01); *G01C 11/04* (2013.01); *G01C 21/005* (2013.01); *G01C 21/203* (2013.01); *G06T 7/60* (2013.01); *H04N 5/144* (2013.01); *H04N 5/232* (2013.01); *H04N 5/23254* (2013.01); *H04N 5/23267* (2013.01); *H04N 7/181* (2013.01); *G06T 2207/10004* (2013.01); *G06T 2207/30248* (2013.01)

(58) Field of Classification Search
CPC ......... G06T 7/0042; G06T 7/60; G01C 11/04; G01C 21/005; G01C 21/203; H04N 5/232
See application file for complete search history.

(56) References Cited

PUBLICATIONS

Honey, S., and K. Milnes. "The Augmented Reality America's Cup." Retrived from http://spectrum.ieee.org/consumer-electronics/audiovideo/the-augmented-reality-americas-cup(2013). (Year: 2013).*

* cited by examiner

*Primary Examiner* — Nirav G Patel

(57) ABSTRACT

A system and method for determining positional order of vehicles across a threshold plane within a dynamic environment is provided. The system can include moving vehicles (e.g., boats) each having a GPS receiver. A reference object (e.g., an anchored boat) can have an image capturing device and a primary GPS receiver, and can be subject to movement induced by the dynamic environment. A fixed object having a known position (e.g., a government buoy) relative to the reference object define a threshold plane, which is subject to movement based on movement of the reference object. Photometric data gathered by the image capturing device and geospatial data gathered from the GPS receivers, the primary GPS receiver, and the fixed object is analyzed by a processor to determine a positional order at which each vehicle crossed the movable threshold plane.

21 Claims, 4 Drawing Sheets

AUTOMATED SYSTEM AND METHOD FOR DETERMINING POSITIONAL ORDER THROUGH PHOTOMETRIC AND GEOSPATIAL DATA

BACKGROUND

Determining time and position of vehicles during a race is important, particularly as they cross a finish line. Of particular difficulty is determining a finishing order of racing sailboats, for example. Existing methods include manual time keeping, which relies upon human eyes and stopwatches. However, such methods have various drawbacks that can result in errors when determining finishing order. In addition, environmental forces, such as wind, oceanic currents, and waves also contribute to difficulties in accurately determining finishing order of racing sailboats.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
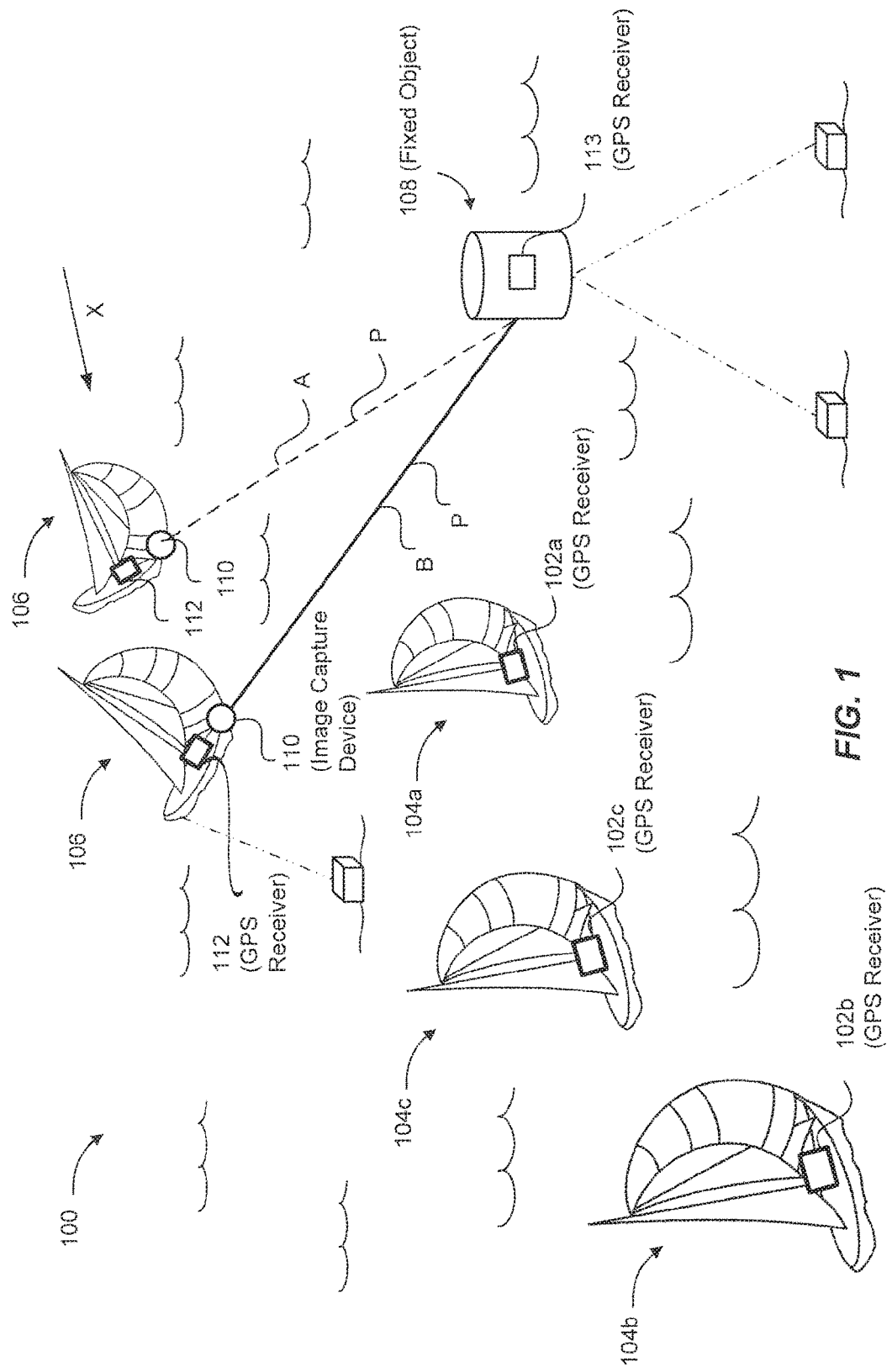
FIG. 1 is an illustration of a system for determining time and positional order of vehicles across a threshold plane in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one example there is provided a system for determining positional order of vehicles across a threshold plane within a dynamic environment. The system can include a plurality of GPS receivers that are each mounted on respective moving objects, such as vehicles. A reference object can have an image capturing device and a primary GPS receiver. The reference object can be subject to movement induced by the dynamic environment (such as a boat on a surface of water being subjected to wind, current, and/or waves). The system can include a fixed object having a known position (e.g., a government buoy) and can be located at a position relative to the reference object. A threshold plane can be defined by a distance between the reference object and fixed object, or a threshold plan extending through points defined by the reference object and the fixed object. The image capturing device on the reference object can have a focal point directed toward the fixed object along the threshold plane. The threshold plane can be subject to movements induced by movement of the reference object. For example, the threshold plane can be a finishing line for racing sailboats whereby the threshold plane can move due to movement of the reference object from forces induced by the environment. Photometric data can be gathered by the image capturing device and geospatial data can be gathered from the plurality of GPS receivers, the primary GPS receiver, and the known location of the fixed object. The system can include a computer system having a processor configured to receive the photometric data and geospatial data, and also configured to determine a positional order at which the vehicles cross the threshold plane by comparing the position of each vehicle relative to the threshold plane based on data sets obtained from the photometric and geospatial data.

The moving vehicles and the reference object can each comprise at least one of a water vehicle or air vehicle. The known position of the fixed object can be gathered from a GPS receiver on the fixed object, or the known position can be determined based on the fixed object's known mapping location having a predetermined latitude and longitude. A distance of the threshold plane (between the reference object and the fixed object) can be calculated based on the primary GPS receiver location and the known location of the fixed object.

The processor can be configured to compare successive images gathered from the image capturing device to determine a displacement distance and a velocity of at least one of the vehicles. The processor can decode and analyze super frame data and time delta data to determine a relative time and a relative position for each vehicle as it crosses the threshold plane. The processor can be configured to align time of data logs gathered from the photometric data and geospatial data to determine the positional order at which the vehicles cross the threshold plane. Various calibrations can be performed beforehand to sync the time of data of the photometric and geospatial data or data sets.

In one example there is provided a method for determining positional order of vehicles crossing a threshold plane within a dynamic environment. The method can include identifying one or more moving vehicles, each comprising a GPS receiver for determining a respective vehicle location. The method can include positioning a reference object relative to a fixed object having a known position. The reference object can have an image capturing device and a primary GPS receiver. The reference object and the fixed object can define a threshold plane between them, and the threshold plane can be subject to movements induced by the movements of the reference object. The method can include capturing images with the image capturing device of the vehicles crossing the threshold plane. The method can include receiving geospatial data gathered from the GPS receivers, the primary GPS receiver, and the known position of the fixed object. The method can include receiving photometric data gathered by the image capturing device. The method can include comparing the position of each vehicle at a time each vehicle crosses the threshold plane by analyzing the photometric data and the geospatial data. The method can include indicating and/or displaying a determined positional order at which each vehicle crossed the threshold plane. The method can include comparing the position by aligning time of data logs gathered from the photometric data and geospatial. The method can include determining a reference time and a reference position of the reference object based on the data gathered from the primary GPS receiver and the known position of the fixed object. The method can include analyzing successive images gathered from the image capturing device as each vehicle is adjacent to or across the threshold plane to determine at least one of a displacement distance and a velocity of at least one of the vehicles. The method can include decoding super frame data and time delta data to determine a relative time and a relative position for each vehicle as it crosses the threshold plane.

In another example a method is provided for determining finishing order of boats crossing a finishing line. The method can include identifying one or more boats in a race, each comprising a GPS receiver for determining a respective boat location. The method can include positioning a reference boat relative to a fixed object having a known position, whereby the reference boat and the fixed object define a finishing line between them that is subject to movements induced by the movements of the reference boat. The method can include indicating a determined positional order at which each boat crossed the finishing line by analyzing photometric data gathered from an image recording device on the reference boat as compared to geospatial data gathered from the GPS receiver on each boat, a primary GPS receiver on the reference boat, and the known position of the fixed object. The method can include allowing the reference boat to move due to environmental forces acting on the reference boat, thereby facilitating a dynamic finishing line.

Figure 2:
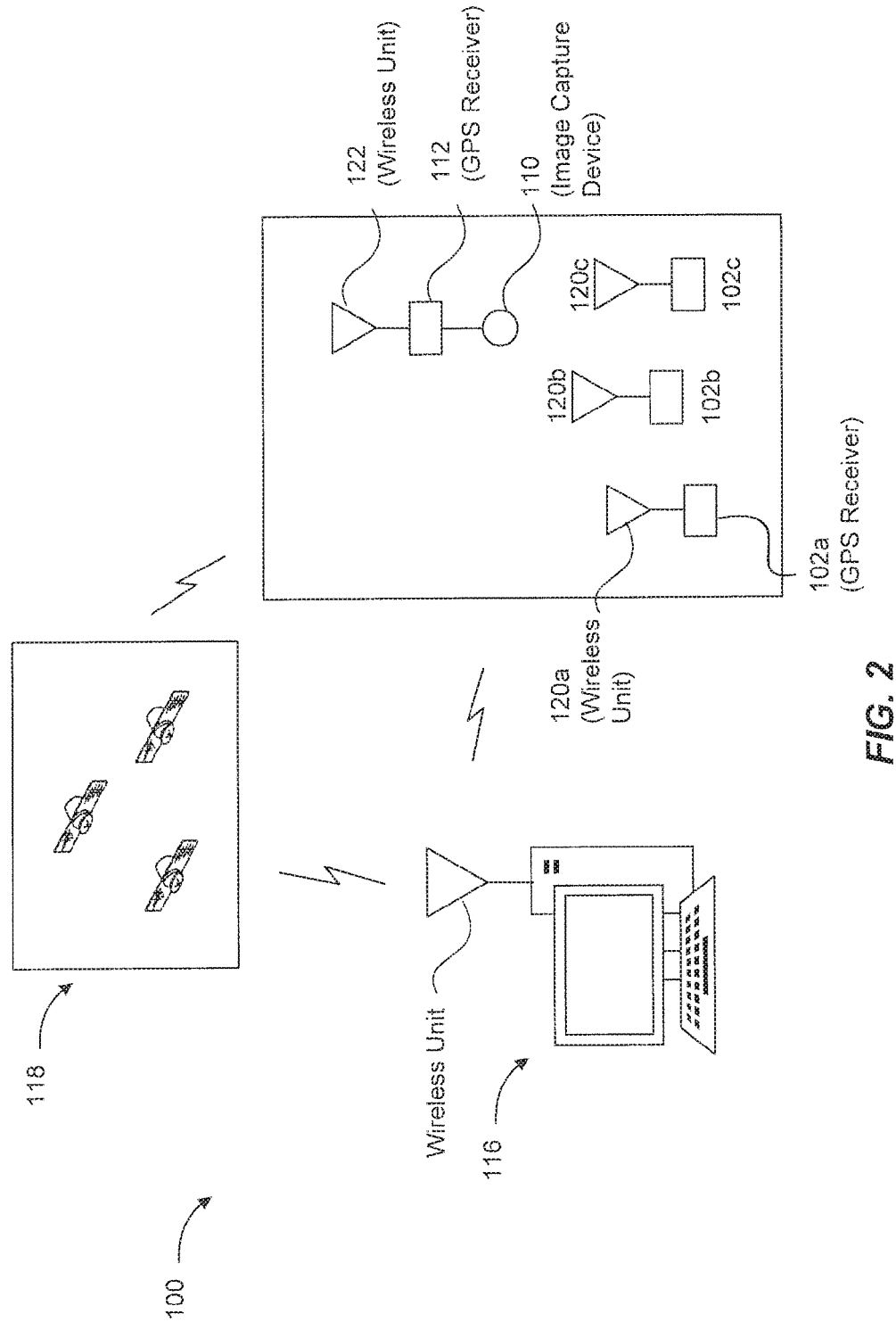
FIG. 2 is an illustration of a communication system usable with the system of FIG. 1 in accordance with an example of the present disclosure.

FIGS. 1 and 2 illustrate a method and system (collectively "100") for determining positional order of vehicles across a threshold plane P. As will be explained in more detail below, by collecting pictorial evidence of all vehicles crossing a finishing line (or other threshold plane) between two GPS-measured locations, geometry and time extrapolation can determine when a vehicle crosses the threshold plane. Pictorial evidence may be obtained through the use of a video camera or a sequence of still photographs taken at a frame rate sufficient to capture the appropriate detail at the threshold plane (e.g., finish line). This disclosure sets forth technology that incorporates the use of GPS data to continuously track the reference object as the "moving" point or end of the threshold plane in reference to the "fixed" object end or point of the threshold plane, and to provide spatial and temporal reference to a mark and surrounding boats that can be used to determine position through geometry.

In one example, this can occur within a dynamic environment, meaning an environment in which the reference object, the fixed object, and/or the threshold plane extending between them, can be subject to movement, such as due to environmental conditions or influences. The system 100 can include a plurality of GPS receivers 102a, 102b, 102c mounted on respective moving vehicles 104a, 104b and 104c. In the example of FIG. 1, the moving vehicles are sailboats racing each other, and the threshold plane P is a finishing line (or an inter-race checkpoint). However, the features described in the present disclosure can be implemented in other systems within dynamic environments, such as objects (e.g., airplanes) participating in an air race.

In the example shown, each GPS receiver can be located on the individual racing sailboats (the moving objects), such as mounted to a mast or the bow of a respective sailboat, for example. It will be recognized that the vehicles can comprise other types of moving objects, such as cars, planes, helicopters, submarines, or others, or a combination of these.

A reference object 106 can be positioned relative to a fixed object 108 having a known location. The reference object 106 can include an image capturing device 110 (e.g., a video camera) with its position mapped with GPS. The reference object can further include or have thereon a primary GPS receiver 112, which can be electrically coupled together in an apparatus, or can be separate apparatuses, on the reference object 106. The reference object 106 can be subject to movement induced by the environment, such as wind, waves, and/or oceanic currents, and can therefore vary in its position, thus providing a moving point or end of the threshold plane. The fixed object 108 can have a known position determined by a fixed mapping point or by a GPS receiver 113 thereon. Thus, the primary GPS receiver 112 on the reference object 106 and the known position of the fixed object 108 can define the threshold plane P extending between them. The threshold plane P can also be subject to movements as a result of movement of the reference object 106 induced by the environment.

As one example, in a sailboat race the reference object 106 can be a committee or referee boat anchored to a sea floor or subsurface, as shown. The committee boat can be tasked with defining a finishing line and assisting with determination of the time and positional order at which racing sailboats cross the finish line. Even when anchored, however, the committee boat can experience movements caused or induced by the environment or other factors, such as winds, oceanic currents, and/or waves. Thus, it can be quite difficult to accurately ascertain the time and positional order at which racing sailboats cross the finish line. In one example of a dynamic threshold plane (e.g., finishing line), at a time before a race is completed the threshold plane P can be at position A (as shown by the dashed line) as defined by a distance between the reference object 106 and the fixed object 108. As the vehicles 104a, 104b, and 104c approach the threshold plane P at position A, the reference object 106 may be displaced a certain distance away from its original position in a direction shown by arrow X. Thus, the threshold plane P can be subject to movements (in this case the threshold plane is shown as being moved from position A to position B).

Once one of the vehicles comes in view of the image capturing device, video or still images can begin to be captured by the image capturing device 110 along the threshold plane P. To accomplish this, the image capturing device 110 can be positioned and activated such that it captures video and/or images directly down the line of the threshold plane, or in other words can have its focal plane directed down the line of the threshold plane so as to be able to capture (e.g., in video or still image format) the moving vehicles as they cross the threshold plane. This represents photometric data. In addition, geospatial data, such as GPS time and position, can be simultaneously gathered and logged from the GPS receivers 102*a-c*, the primary GPS receiver 112, and the known location of the fixed object 108, as each vehicle crosses the threshold plane P (of course, by the time all vehicles have crossed the finish line, the threshold plane may have again moved to a different position, which positions can be different for each moment in time a vehicle crosses the plane). The gathered photometric data and geospatial data (being time synced) can be utilized (e.g., transferred to a computer) to accurately determine a time and positional order of each vehicle 104*a-c* relative to the threshold plane P at the particular moment in time each vehicle crossed the plane.

In order to determine positional order of moving vehicles across a threshold plane P, a computer system 116 (having a processor, memory, storage, etc.) can be configured to receive and analyze the gathered photometric data and geospatial data by comparing the time and position of each moving vehicle relative to the threshold plane at the moment said vehicle crosses the plane (FIG. 2). Stated differently, the computer can be configured to time-align the GPS logs and the video. In this case, "time alignment" pertains to the process of signal processing, and means that events can be resolved to a specific level of time measurement to permit "alignment" or time "hacks" to a time base. This means that if events are resolved to one second intervals, the events can be aligned to the one second boundary and are "time aligned" to the start of a given second in order to align the time of the events, such as the time of the events logged or captured by the primary GPS receiver, the GPS receivers, and the image capturing device.

Transmitting and receiving GPS coordinates of moving or stationary objects can comprise a system of a plurality of satellites (e.g., four or more satellites 118) to triangulate the exact location of a GPS receiver 102*a-c*. The accuracy of the position of a GPS receiver can be less than a foot, and a GPS receiver can transmit position coordinates between one time-per-second to one thousand times-per-second, depending on the receiver.

The position coordinates can be transmitted by known means to a collection unit, such as a computer system 116 connected to the internet, or having a radio or satellite receiver. As illustrated on FIG. 2, each GPS receiver 102*a-c* on each vehicle 104*a-c* can be coupled to a wireless unit 120*a-c* configured to convert an acquired geospatial data into a wireless signal for transmitting to the computer system 116, for instance (known as "active tracking" or "real-time tracking"). The primary GPS receiver 112 and the image capturing device 110 can also be coupled to a wireless unit 122 for transmission of their respective photometric and geospatial data to the computer system 116, or they can be directly coupled to the computer system 116, such as one located on the reference object 106, for example. Alternatively, the geospatial data and photometric data can be locally uploaded to the computer system 116 at a later time (e.g., after the race) for analysis and determination of positional order (i.e., "passive tracking"). In some aspects, the system can be automated with data uploaded in real-time to the computer system for automated determination of time and positional order at which the vehicles cross the threshold plane.

The determination of finishing order, for example, can be achieved by a computer program executed by the processor that compares the position of each vehicle at a time each vehicle crosses the threshold plane by analyzing the photometric data and the geospatial data, as exemplified herein. The processor can be configured to execute instructions that align time of data logs gathered from the photometric data and the geospatial data, and then that compares the time aligned logs to the relative positional data of the reference object 106, the fixed object 108, and one or more of the vehicles 104*a-c*. Based on such comparison, the processor can then execute instructions that indicate (and/or cause to be displayed) a determined positional order of when each vehicle crossed the threshold plane P at whatever position the threshold plane P may have been when crossed. Positional order can be based on a sequence of frames. For instance, if a frame is taken every second then the frame is aligned to the second boundary. The frames can also contain an acceding sequence number within the metadata of each frame. In this way a first frame would be "1" and the second frame "2". Thus, frame "120" would show information two minutes (120 seconds) after frame 1. In a practical implementation, the time resolution would come from a frame rate of 10 to 120+ frames per second. This would yield 0.1 to 0.008 seconds. Thus, the frame where the geometry of a particular image frame is consistent with crossing the threshold plane P can then be recorded as the finish time for that particular vehicle.

For every frame in which a moving vehicle is in view, the distance between the reference vehicle and the fixed object is calculated using the GPS logs and the mapped location, thus accounting for "drift" away from the original point at the frequency of GPS updates. Using successive images, the system can compute the displaced distance and the speed of the approaching vehicle. On successive images when the moving vehicle has crossed the threshold plane, the system can use the Super Frames and corresponding Deltas to extrapolate the time within the video or photometric data that the moving vehicle crossed the threshold plane. As further discussed above, the positional order can be determined by the timeline or time alignment of the image frames generated by the image capturing device (e.g., video camera, smart phone, or other imager). Thus, these image frames can be used to interpolate the exact moment a vehicle crosses the threshold plane, when necessary.

In some situations where a vehicle crosses a particular threshold plane at a high velocity (i.e., such that there is not an image frame of the exact moment of the boat crossing the plane), or where two vehicles cross at nearly the exact same moment, for example, the processor can be configured to execute instructions that compare successive images gathered from the image capturing device to determine a displacement distance and a velocity of at least one of the vehicles. This can be achieved by decoding super frame data and time delta data to determine a relative time and a relative position of vehicle(s) to interpolate the time at which the vehicle(s) crossed the threshold plane. Other factors and margins for error can contribute to the possible inability to determine the precise time a vehicle crossed the threshold plane. For example, consider a thirty frames/second video camera coupled to the reference object 106. If the reference object 106 drifts due to a wind of 10 knots, the reference object 106 would drift 60,000 feet/hour (or 16.67 feet/second). In a given image frame, the reference object 106 will drift 16.67 feet per 30 frames/second, which results in about half a foot in error. If necessary, inter-frame interpolation can be used to reduce this error down to less than an inch, as described above. This level of fidelity exceeds the resolving power of a video camera and is therefore not a limiting factor. In addition, position resolution can be limited by the optical resolution of the video camera. Consider a camera that is approximately twenty megapixels. Such a camera can have up to 4000 pixels in width. If there is a 400 foot field of view of the finish line (e.g., the threshold plane), each pixel would be on the order of an inch. Motion, vibration, or camera focus can contribute to error in determining finishing order, as will the frequency of updated geospatial data of every GPS receiver. However, this possibility of error can be minimized (or neglected) by interpolating data gathered from successive frames to determine the exact moment in time that a particular vehicle crossed the finishing line, as discussed above.

Figure 3:
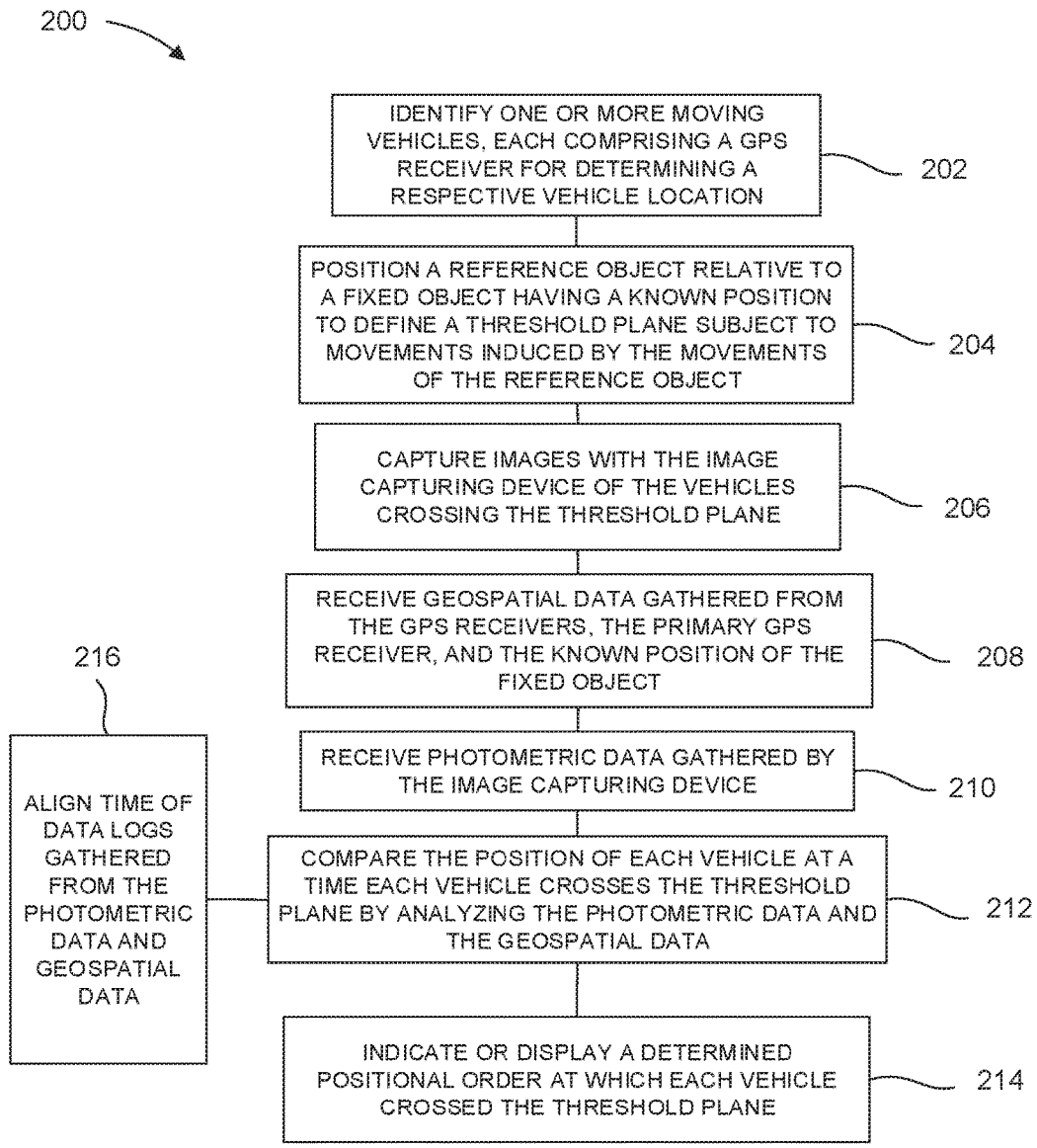
FIG. 3 is an illustration of a method for determining time and positional order of vehicles across a threshold plane in accordance with an example of the present disclosure.

FIG. 3 illustrates a method 200 for determining positional order of vehicles crossing a threshold plane within a dynamic environment. The method 200 can include identifying 202 one or more moving vehicles, each vehicle comprising a GPS receiver for determining a respective vehicle location. Step 204 can include positioning a reference object relative to a fixed object having a known position. The reference object can have an image capturing device and a primary GPS receiver, whereby the reference object and the fixed object define a threshold plane between them, and whereby the threshold plane is subject to movements induced by movements of the reference object. Step 206 can include capturing images with the image capturing device of the vehicles crossing the threshold plane. Step 208 can include receiving geospatial data gathered from the GPS receivers, the primary GPS receiver, and the known position of the fixed object. Step 210 can include receiving photometric data gathered by the image capturing device. Step 212 can include comparing the position of each vehicle at a time each vehicle crosses the threshold plane by analyzing the photometric data and the geospatial data. Step 214 can include indicating or displaying a determined positional order of when each vehicle crossed the threshold plane. Step 216 can include aligning time of data logs gathered from the photometric data and geospatial data.

Figure 4:
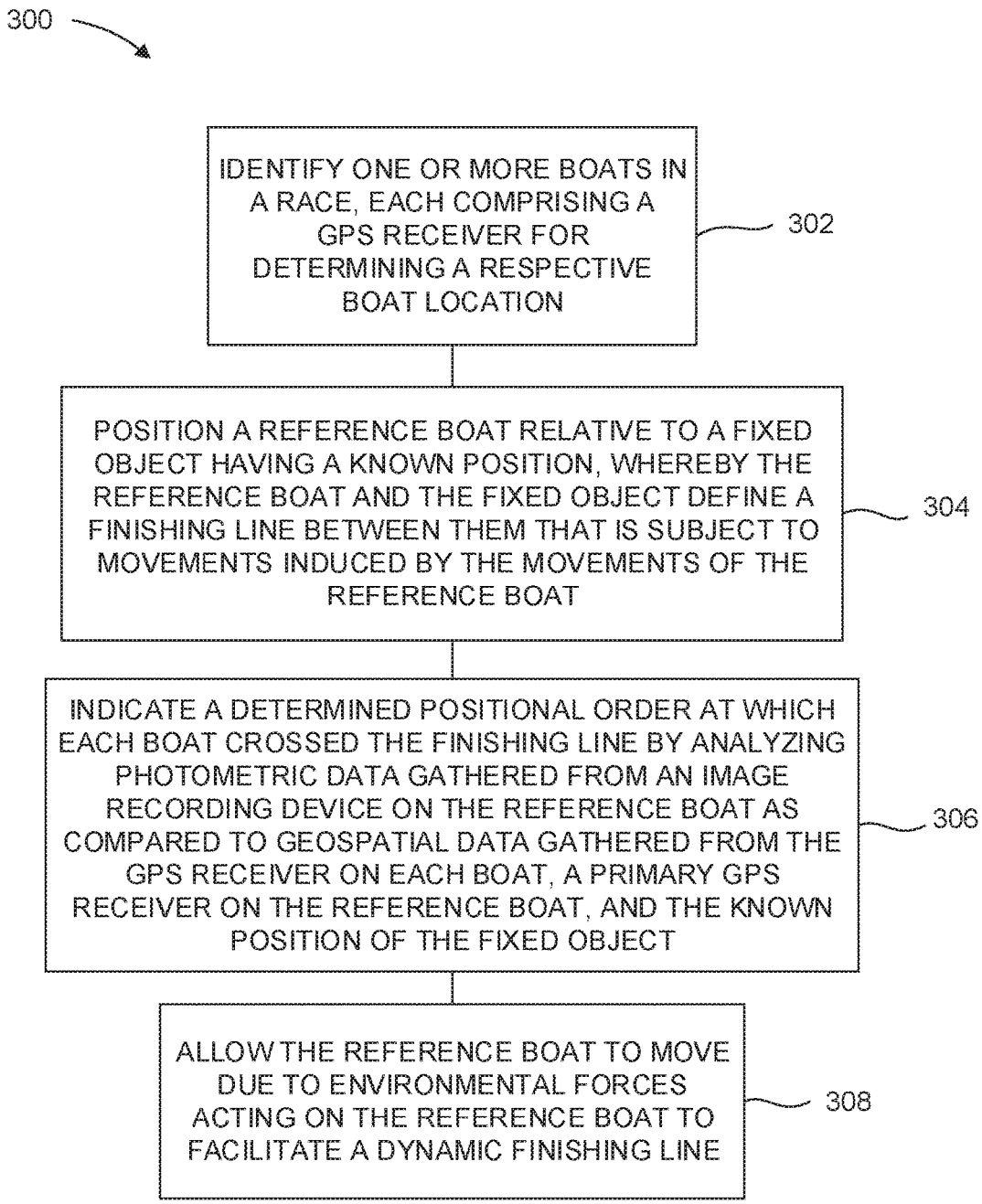
FIG. 4 is an illustration of a method for determining time and positional order of vehicles across a threshold plane in accordance with an example of the present disclosure.

FIG. 4 illustrates a method 300 for determining finishing order of boats crossing a finishing line. The method 300 can include step 302 of identifying one or more boats in a race, each comprising a GPS receiver for determining a respective boat location. Step 304 can include positioning a reference boat relative to a fixed object having a known position, whereby the reference boat and the fixed object define a finishing line between them that is subject to movements induced by the movements of the reference boat. Step 306 can include indicating a determined positional order at which each boat crossed the finishing line by analyzing photometric data gathered from an image recording device on the reference boat as compared to geospatial data gathered from the GPS receiver on each boat, a primary GPS receiver on the reference boat, and the known position of the fixed object. Step 308 can include allowing the reference boat to move due to environmental forces acting on the reference boat, thereby facilitating a dynamic finishing line.

[Alternative Embodiment]In an alternative embodiment, the reference object can be a fixed object (such as a buoy having a GPS receiver and/or a fixed mapping point) instead of a boat. An image capturing device could be mounted on such reference object and used as discussed in the present disclosure. If both the reference object and fixed object are buoys, one or both may be movable by forces induced by the environment, thereby causing a dynamic threshold plane through which the moving objects may pass through. In another alternative embodiment, manual time-keeping and image capturing can be utilized. For example, a person having a stop watch (or other time keeping device) and a video recorder on the reference object can video record the vehicles as they cross a particular threshold plane and then "time align" the images of the video with the exact time captured by the stop watch during video recording. Other mechanisms that can be implemented with the present methods are paper strips with a means of marking the strip. This can be done with ink or (in some cases) a repeating spark marking the paper as it is drawn through the space gap. Still another mechanism that can be used with the existing methods is to photograph an oscilloscope trace. Yet another mechanism is to use mechanical or electro optical mechanisms to start and stop timers.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for determining order of vehicles across a threshold plane within a dynamic environment, the system comprising:
   a plurality of GPS receivers, each mounted on respective moving vehicles;
   a reference object having an image capturing device and a primary GPS receiver, whereby the reference object is subject to movement induced by the dynamic environment;
   a fixed object having a known position relative to the reference object, the primary GPS and the fixed object defining a threshold plane between them, whereby the threshold plane is subject to movements induced by movement of the reference object;
   photometric data gathered by the image capturing device and geospatial data gathered by the GPS receivers, the primary GPS receiver, and the known location of the fixed object; and
   a processor configured to receive the photometric data and geospatial data, and to decode super frame data and time delta data, to determine a positional order at which the vehicles cross the threshold plane by comparing the position of each vehicle relative to the threshold plane.

2. The system of claim 1, wherein the vehicles each comprise water vehicles or air vehicles.

3. The system of claim 1, wherein the fixed object either includes a GPS receiver to indicate the known position or includes a fixed mapping location having a latitude and longitude.

4. The system of claim 1, wherein the primary GPS receiver is time synced with the image capturing device for determination of a reference time and a reference position of the reference object relative to the fixed object.

5. The system of claim 1, wherein a distance of the threshold plane between the reference object and the fixed object is calculated based on the geospatial data gathered from the primary GPS receiver and the known location of the fixed object.

6. The system of claim 1, wherein the processor is further configured to compare successive images gathered from the image capturing device to determine a displacement distance and a velocity of at least one of the vehicles.

7. The system of claim 1, wherein the super frame data and the time delta data are decoded by the processor to interpolate a relative time and a relative position for each vehicle as it crosses the threshold plane.

8. The system of claim 1, wherein the processor is configured to time-align data logs gathered from the geospatial data and photometric data to determine the positional order at which the vehicles cross the threshold plane.

9. The system of claim 1, wherein the image recording device comprises a video recording device having a focal point directed toward the fixed object at least along the threshold plane.

10. The system of claim 1, wherein the geospatial data comprises a relative time and a relative position logged by each GPS receiver of each vehicle as it crosses the threshold plane.

11. The system of claim 1, wherein the fixed object comprises a buoy secured to a floor or subsurface of a body of water and positioned proximate a surface of the body of water, and wherein the reference object comprises a boat.

12. The system of claim 1, wherein the plurality of vehicles comprise sailboats racing each other, and wherein the threshold plane comprises a finishing line for the racing sailboats.

13. The system of claim 1, wherein the reference object or the fixed object comprises at least one of a boat, submarine, unmanned underwater vehicle, buoy, raft, drone, balloon, or helicopter.

14. A method for determining order of vehicles crossing a threshold plane within a dynamic environment, the method comprising:
   identifying one or more moving vehicles, each comprising a GPS receiver for determining a respective vehicle location;
   positioning a reference object relative to a fixed object having a known position, the reference object having an image capturing device and a primary GPS receiver, whereby the reference object and the fixed object define a threshold plane between them, whereby the threshold plane is subject to movements induced by the movements of the reference object;
   capturing images with the image capturing device of the vehicles crossing the threshold plane;
   receiving geospatial data gathered from the GPS receivers, the primary GPS receiver, and the known position of the fixed object;
   receiving photometric data gathered by the image capturing device;
   comparing the position of each vehicle, with a processor, at a time each vehicle crosses the threshold plane by analyzing the photometric data and the geospatial data, and by decoding super frame data and time delta data to determine a positional order at which each vehicle crossed the threshold plane; and
   indicating or displaying the positional order determined by the processor.

15. The method of claim 14, wherein comparing the position includes aligning time of data logs gathered from the photometric data and the geospatial data.

16. The method of claim 14, further comprising determining a reference time and a reference position of the reference object based on the data gathered from the primary GPS receiver and the known position of the fixed object.

17. The method of claim 14, further comprising analyzing successive images gathered from the image capturing device as each vehicle is adjacent to or across the threshold plane to determine at least one of a displacement distance and a velocity of at least one of the vehicles.

18. The method of claim 14, wherein decoding super frame data and time delta data comprises interpolating a relative time at which each vehicle crossed the threshold plane.

19. A method for determining finishing order of boats crossing a finishing line, the method comprising:
   identifying one or more boats in a race, each comprising a GPS receiver for determining a respective boat location;
   positioning a reference boat relative to a fixed object having a known position, whereby the reference boat and the fixed object define a finishing line between them that is subject to movements induced by the movements of the reference boat;
   indicating a positional order, as determined by a processor, at which each boat crossed the finishing line by analyzing photometric data gathered from an image recording device on the reference boat as compared to geospatial data gathered from the GPS receiver on each boat, a primary GPS receiver on the reference boat, and the known position of the fixed object, wherein the processor is configured decode super frame data and time delta data to interpolate a relative time at which each boat crosses the finishing line to determine the position order.

20. The method of claim 19, further comprising allowing the reference boat to move due to environmental forces acting on the reference boat, thereby facilitating a dynamic finishing line, and accounting for the movement.

21. A system for determining order of vehicles across a threshold plane within a dynamic environment, the system comprising:
- a plurality of GPS receivers, each mounted on respective moving vehicles;
- a reference object having an image capturing device and a primary GPS receiver, whereby the reference object is subject to movement induced by the dynamic environment;
- a fixed object having a known position relative to the reference object, the primary GPS and the fixed object defining a threshold plane between them, whereby the threshold plane is subject to movements induced by movement of the reference object, wherein the image recording device has a focal point directed toward the fixed object at least along the threshold plane;
- photometric data gathered by the image capturing device and geospatial data gathered by the GPS receivers, the primary GPS receiver, and the known location of the fixed object; and
- a processor configured to receive the photometric data and geospatial data and to determine a positional order at which the vehicles cross the threshold plane by comparing the position of each vehicle relative to the threshold plane.

* * * * *